United States Patent [19]

Shii et al.

[11] Patent Number: 4,467,010

[45] Date of Patent: Aug. 21, 1984

[54] OIL-IMPREGNATED POLYOLEFIN FILM FOR ELECTRIC INSULATION AND MANUFACTURING METHOD FOR THE SAME

[75] Inventors: Hikaru Shii; Humio Sugimoto, both of Tokyo, Japan

[73] Assignee: The Furukawa Electric Co., Ltd., Tokyo, Japan

[21] Appl. No.: 349,680

[22] Filed: Feb. 17, 1982

[30] Foreign Application Priority Data

Feb. 25, 1981 [JP] Japan ................................ 56-25373

[51] Int. Cl.³ ................................ B32B 7/02

[52] U.S. Cl. ................................ 428/212; 427/57; 427/79; 427/172; 428/291; 428/910

[58] Field of Search ................ 428/497, 910, 212, 291; 427/57, 79, 172

[56] References Cited

U.S. PATENT DOCUMENTS 3,928,705 12/1975 Loft et al. ................ 428/311
4,170,665 10/1979 Behn et al. ................ 427/79
4,418,641 12/1983 Nakashima et al. ................ 427/57

FOREIGN PATENT DOCUMENTS 49-18519 5/1974 Japan .
2132267 11/1972 France.

OTHER PUBLICATIONS

Pages 1 and 253–261, Polymer Science and Technology, vol. 1, Structure and Properties of Polymer Films. Chem. Abstracts, vol. 88, No. 18, 1st May 1978, Page 591, No. 129838a.

Development of Oil-Impregnated, All-Polypropylene-Film Power Capacitor, IEEE Transactions on Electrical Insulation, vol. Ei-12, No. 4, Aug. 1977, pp. 293–301.

*Primary Examiner*—George F. Lesmes
*Assistant Examiner*—P. R. Schwartz
*Attorney, Agent, or Firm*—Frishauf, Holtz, Goodman & Woodward

[57] ABSTRACT

The present invention provides a polyolefin film for electric insulation which is obtained by using a uniaxially drawn film of crystalline polyolefin, in which intramicrofibril and intermicrofibril amorphous parts of the uniaxially drawn film are impregnated with a low loss insulation oil, and which simultaneously satisfies the following conditions:

(i) a tensile Young's modulus of the film impregnated with the insulation oil is $2\times10^4$ kg/cm$^2$ or higher;
(ii) a dimensional change (change in length) of the uniaxially drawn film in the insulation oil at 100° C. is within a tolerance of ±2%;
(iii) a ratio of a long period at room temperature of an ether extraction residue of the uniaxially drawn film to a long period thereof before ether extraction is within a range of 0.900 to 0.998; and
(iv) a dimensional increase of the ether extraction residue in the insulation oil at 100° C. is 0.1% or higher.

25 Claims, 9 Drawing Figures

OIL-IMPREGNATED POLYOLEFIN FILM FOR ELECTRIC INSULATION AND MANUFACTURING METHOD FOR THE SAME

BACKGROUND OF THE INVENTION

The present invention relates to a low loss polyolefin film suitable for insulation of ultra high voltage oil-filled cables (UHV OF cable) and to a manufacturing method therefor.

Conventionally, kraft paper sheets have almost exclusively been used for cable insulation for oil-filled cables (OF cable) when the transmission capacity of the cable was not required to be very large. However, the recent increase in the demand for electric power in urban areas requires ultra high voltage large capacity transmission. A problem in such a trend is that insulation thickness cannot be increased indefinitely even when the transmission voltage is raised because there is a limit to the overall diameter of a cable. Thus, an insulation material having a high dielectric breakdown strength per unit thickness is required. Especially considering the fact that the building of a large capacity power station in urban areas has become difficult, long-distance transmission from remote places to urban centers becomes necessary. For such a long distance high capacity transmission, it is necessary to suppress the dielectric loss of the insulation and heat generation of the cables. In order to achieve this, it is advantageous to use the so-called low-loss material which has a small $\epsilon\cdot\tan\delta$ value. Furthermore since the insulation layer of OF cable is immersed in an insulation oil such as mineral oil, paraffin oil, alkylbenzene oil, and silicone oil, swelling and dissolution of the polymeric insulation materials at high temperatures, not to mention room temperature, must be avoided as far as possible. The need of a low loss material resistant to oil is especially strong in Japan where alkylbenzene oils such as DDB dodecylbenzene oil) are mainly used. Another important property of the insulating material is high tensile Young's modulus. High modulus nonpolar materials are required for preventing buckling due to relative sliding between insulation layers caused when the cable is wound on a drum or bent to extend vertically from the conduit. Plastics generally have a lower Young's modulus than cellulose paper sheets. Therefore, improvements in this problem have been introduced mainly by using materials having high glass transition temperatures or polar materials having benzene rings in the main chains. However, unsatisfactory results as to low-loss characteristic have been obtained, except in some specific cases. Cellulose paper, compared with plastic materials, has stable and excellent dielectric strength, especially when oil-impregnated. However, when plastic materials are used, especially as formed into a laminated body of many layers, an abrupt decrease in the breakdown voltage is frequently confirmed as compared with a single sheet of the same material.

In summary, considering the properties to be possessed by the insulation paper sheets for use for OF cables, a novel material is required, especially in view of the limits of properties, $\epsilon=3.3$ and $\tan\delta=0.15\%$, of the kraft paper sheets, which are inherent values of the material.

For those reasons mentioned above, development of a totally new material is desired which has excellent dielectric breakdown strength, oil resistance and Young's modulus as well as the low dielectric loss characteristics of the starting plastic materials.

Many trials have been made to solve this problem. For example, it has been proposed according to the prior art method to extrude into a sheet a material (e.g., polyethylene terephthalate, polycarbonate) which is less compatible with insulation oils and has a higher dielectric loss as a substitute for the kraft paper sheets. Although those materials may offer no problem in respect of oil resistance, they have a high dielectric loss, which causes considerable heat generation from the cable, and in addition, show ineffective thermal conduction which is inherent to the plastic materials. They are, therefore not necessarily suitable for an ultra high voltage oil-filled cable. For the purpose of improving the bending property of the cable, such a plastic material is given biaxial stretching to increase its Young's modulus. Although this is effective in raising the mechanical strength and the tear strength of plastic, no successful processing to obtain a material having a high Young's modulus sufficiently high to meet the above requirement has been reported yet.

Practically a polypropylene sheet of low dielectric loss was formed into a biaxially drawn film and the properties of the film were examined. But, it failed to reach the required levels of oil resistance and Young's modulus.

In order to solve these problems, various studies have recently been made on composite insulation paper comprising a laminate of kraft paper sheets and plastic layers.

For example, a method has been proposed to achieve a designed insulation thickness. According to this method, the swelling amount of the polymer layers is estimated. The kraft paper sheets are increased in thickness by humidifying according to the estimated amount of swelling. In a later step, the kraft paper sheets are dried to reduce their thickness. However, this method requires a longer time and a greater number of steps. This method therefore is not ideal for manufacturing cables.

Another method has also been proposed to improve heat resistance in the insulation oil. This method utilizes a high material having a melting-point for the polymer layers, such as polypropylene, poly-4-methylpentene-1, or the like. It has also been proposed to reduce the swelling amount of the polymer layers by increasing the crystallinity of polymer or by cross-linking. However, these methods have not been able to provide any favorable results in achieving the expected thickness.

Still another method has also been proposed. In consideration of the fact that the plastic materials inherently tend to swell, this method does not attempt to suppress the swelling. Instead, insulation oil usually used for cables is mixed in the plastic material before extrusion so as to prevent further swelling. However, with this method the insulation oil, which is mixed with the plastic material, evaporates in the high temperature atmosphere produced by extrusion, thus providing unsatisfactory results.

Accordingly, insulation sheets comprising either kraft paper sheets or plastic layers, or a combination of them do not simultaneously meet all of the strict requirements imposed on UHV OF cables mentioned above.

SUMMARY OF THE INVENTION

As a result of extensive studies, it has been found that the problems as described above can be solved by using as a base material polyolefin, which is a typical low dielectric loss plastic material and impregnating the anisotropic amorphous part of the microfibril structure of the drawn polyolefin with electrical insulation oil. The use of the drawn polyolefin and impregnation with electrical insulation oil lead to an appropriate utilization of the stable swelling behaviour of the anisotropic amorphous portion.

BRIEF DESCRIPTION OF THE DRAWINGS

This invention can be more fully understood from the following detailed description, referring to the accompanying drawings, in which.

DETAILED DESCRIPTION OF THE PREFERRED EMBODIMENTS

Crystalline polyolefins are known to be excellent insulation materials because of their inherent dielectric properties. However, detailed studies have not been made on the interaction between these crystalline synthetic plastics and insulation oil.

According to the studies in this respect made by the present inventors, a polymer solution phase of amorphous chains and insulation oil exists in the swollen part of the plastic material in addition to the three phases of crystalline part, amorphous part and the insulation oil when the crystalline synthetic plastic material is placed in the insulation oil. In order to clarify the characteristics of the insulation material in the insulation oil as described above, the phase equilibrium of these components must first be elucidated.

Figure 1:
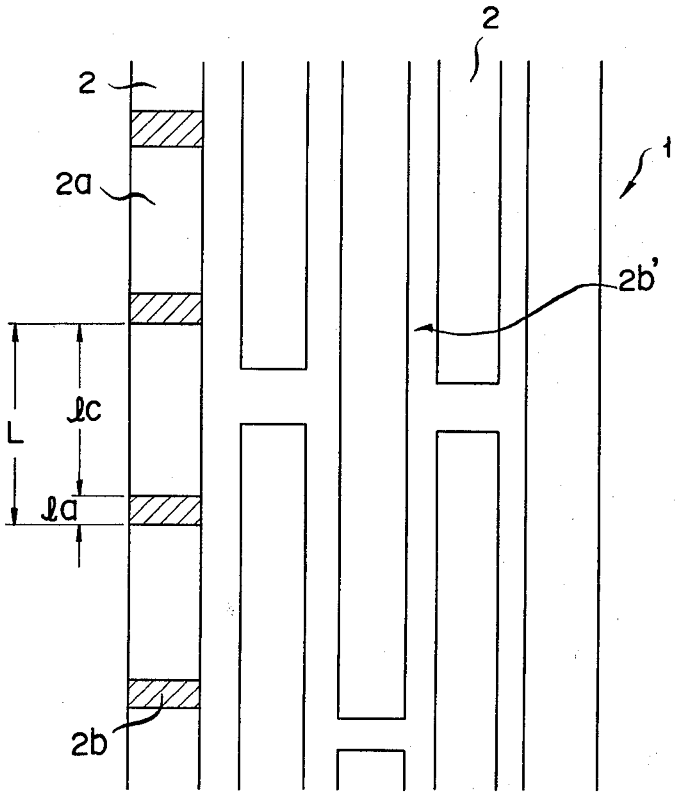
FIG. 1 schematically shows the microfibril structure of the drawn film according to the present invention, wherein lc is the thickness of the crystalline part, la is the thickness of the amorphous part, L is a long period, 1 is a drawn film, 2 is a microfibril, *2a* is the crystalline part, *2b* is the intramicrofibril amorphous, and *2b'* is the intermicrofibril amorphous.
Figure 2:
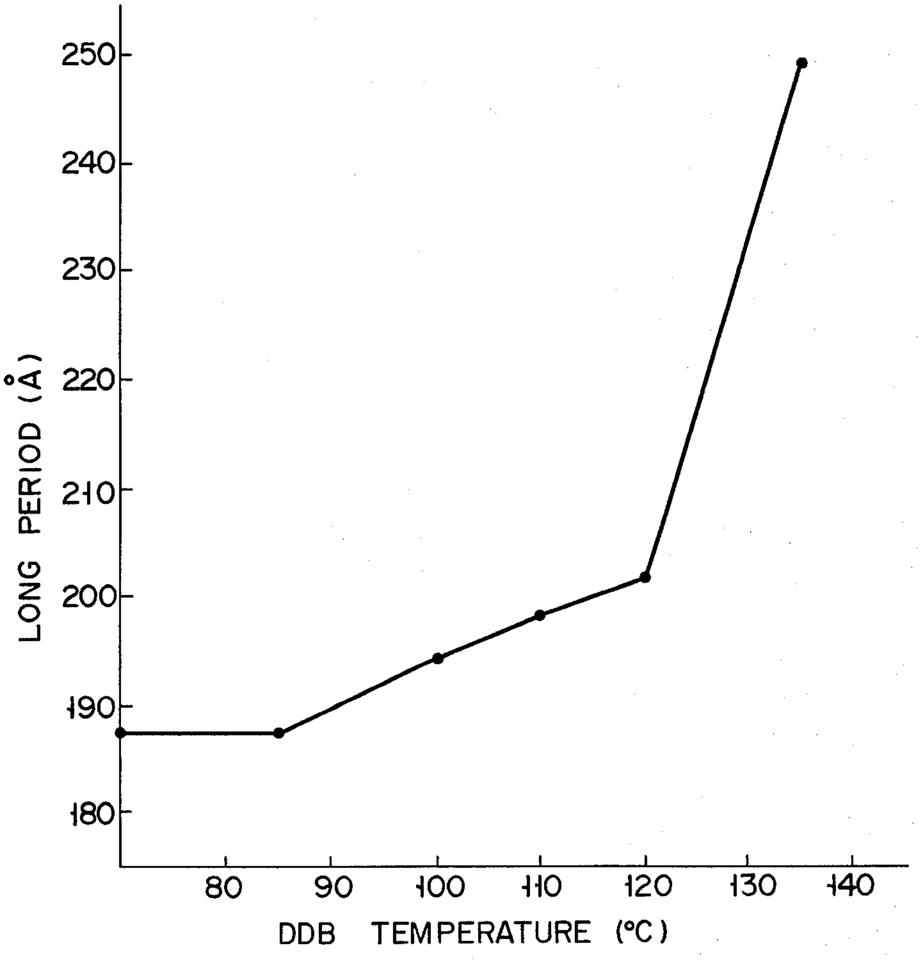
FIG. 2 shows the relationship between the long period of the swollen film (plotted along the ordinate) at room temperature and the temperature of dodecylbenzene oil (DDB) (plotted along the abscissa)

When the fine structure of the drawn film obtained from uniaxial stretching is observed, fiber structure called a microfibril structure is seen to exist. ("Structure and Properties of Polymer Films", Polymer Science and Technology, Volume 1, page 253 to 260, 1973, Plenum Press, New York.) FIG. 1 schematically shows a drawn film 1. A microfibril 2 is a fiber structure which has in general a diameter in the order of 0.01 to 0.02$\mu$. The microfibril 2 includes crystalline parts *2a* of about 100 Å thickness and amorphous parts *2b* having a far smaller thickness which alternate with the crystalline parts. The amorphous parts *2b* are mainly responsible for the swelling of the drawn film 1 in the insulation oil. This may be correctly confirmed by the changes in long period L measured by small angle X-ray diffraction. The long period L is generally expressed by the relation below:

$$L = lc + la$$

where lc is the length of the crystalline part *2a* and la is the length of the amorphous part *2b*. Length lc is not generally changed by swelling. Therefore, a change in length la can be estimated from a change in the long period L. As an example, a mixture of polypropylene and polytetrafluoroethylene was drawn to provide a sample of the drawn film 1. The sample was immersed in dodecylbenzene (DDB), and changes in the long period as a function of the DDB temperature were measured. The results obtained are shown in FIG. 2. It is seen from FIG. 2 that the long period or la changes by about 5 to 8% when the DDB temperature is 85° C. or higher. This change is responsible for the dimensional change of the drawn film. When the DDB temperature exceeds 130° C., the crystalline part starts melting and the fiber structure described above starts reorganization.

Figure 3:
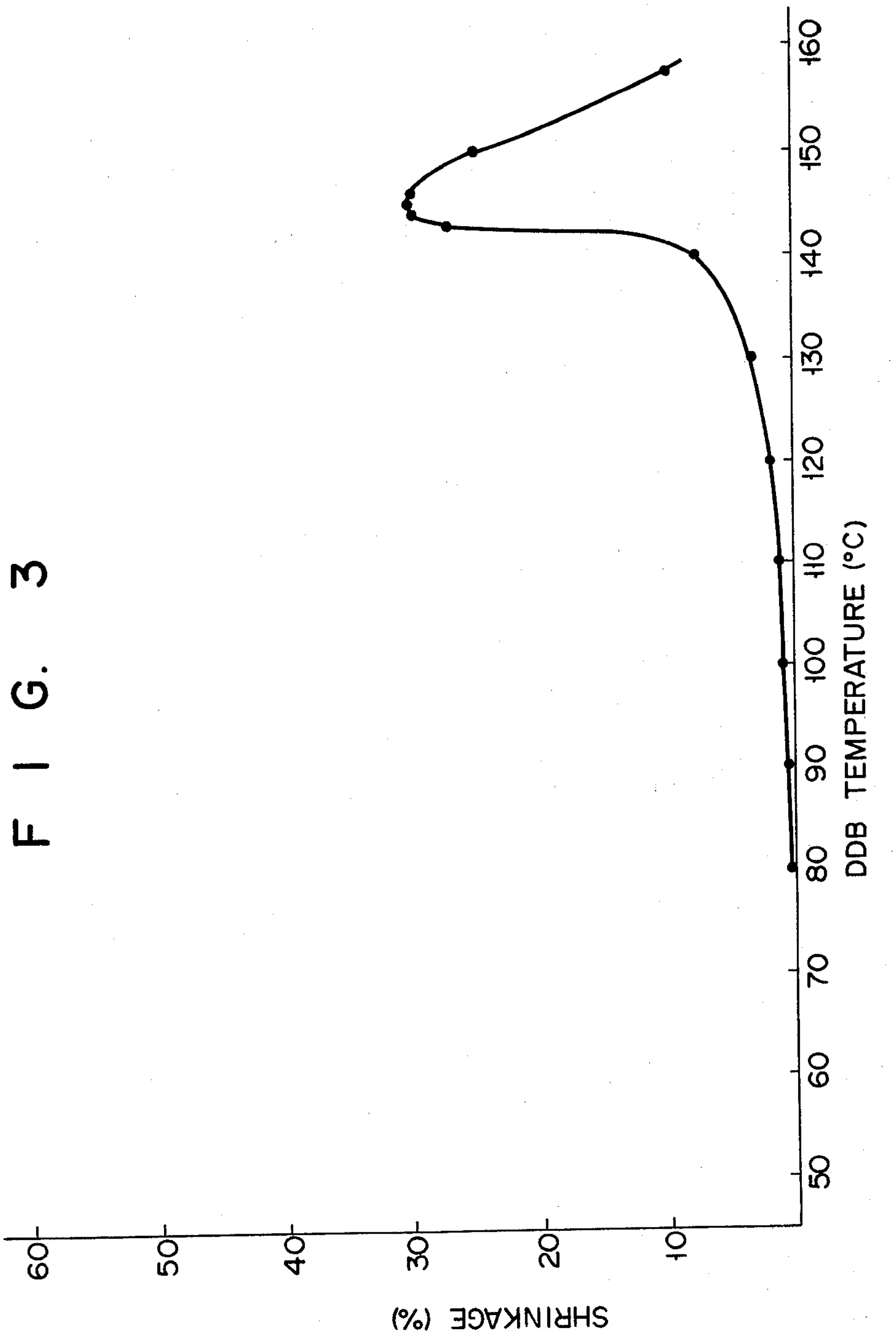
FIG. 3 shows the relationship between the shrinkage (change in length) in the drawn film immersed in DDB (plotted along the ordinate) and the temperature of DDB (plotted along the abscissa)

FIG. 3 shows the dimensional change of the drawn film upon swelling. It is seen from FIG. 3 that in contrast to the aforementioned increase in the long period, the drawn film adversely shrinks in the order of 1 to 3% in the corresponding temperature range. Although this phenomenon cannot be explained when individual fibrils are considered, it can be explained when the intermicrofibril amorphous parts *2b'* (see FIG. 1; formed by mutual sliding of the fibrils during drawing) located between the microfibrils are considered. When amorphous parts *2b'* swell, microfibrils move parallel to each other. This is considered to contribute to the shrinkage of the drawn film in the temperature range mentioned above. The small shrinkage is thus considered to be caused by mutual movement of the microfibrils in spite of the increase in the thickness of the intramicrofibril amorphous parts. As the temperature increases, the crystalline parts start melting, and a shrinkage of 20 to 30% is caused by disturbances in the crystalline chains. The shrinkage becomes maximal at the melting point.

Figure 4:
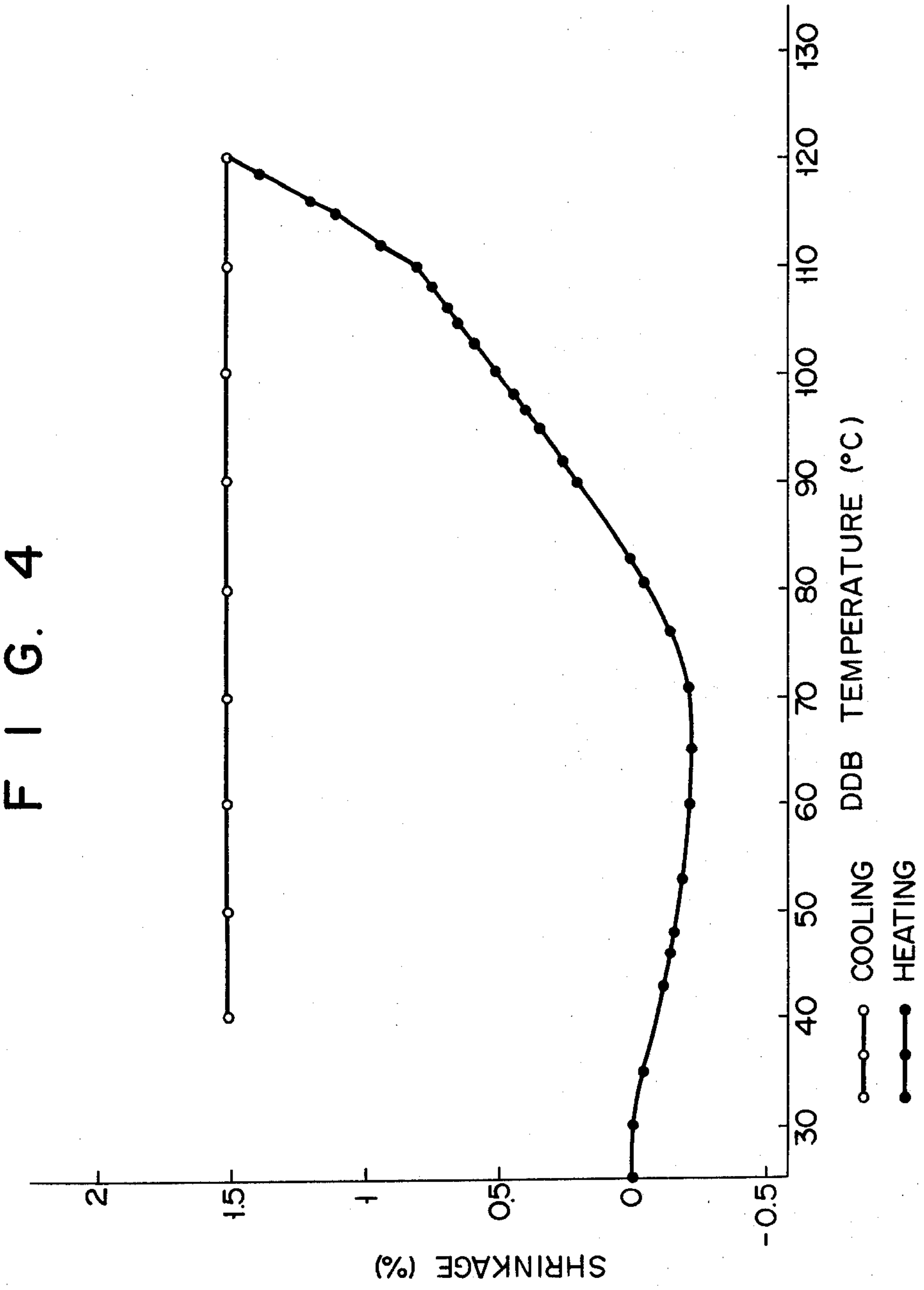
FIGS. 4 to 9 similarly show the relationship between the shrinkage or elongation of the drawn film (plotted along the ordinate) and the temperature of DDB (plotted along the abscissa), the decrease in the thickness being plotted along the ordinate in FIG. 8.

Drawn film was heated in DDB under a tensile stress of about 10 kg/cm$^2$ and FIG. 4 shows the dimensional change of the drawn film. Referring to FIG. 4, the drawn film extends in length by 0.5% or lower up to 70° to 80° C., and then shrinks when the temperature of DDB exceeds this range. If heating is discontinued at a temperature below the temperature at which the partial melting is observed and cooling is then performed, the drawn film in DDB can be brought to room temperature without causing any dimensional change. When the drawn film treated in this manner is heated again, no dimensional change occurs in the film until the temperature reaches the maximum to which the drawn film was first heated. Therefore, the present invention can be said to be a proper utilization, by a special means, of the irreversibleness of the swelling phenomenon in which the above amorphous parts alone are kept; that is, an effective utilization of the memory effect of swelling which existed in the amorphous parts at high temperatures.

Figure 5:
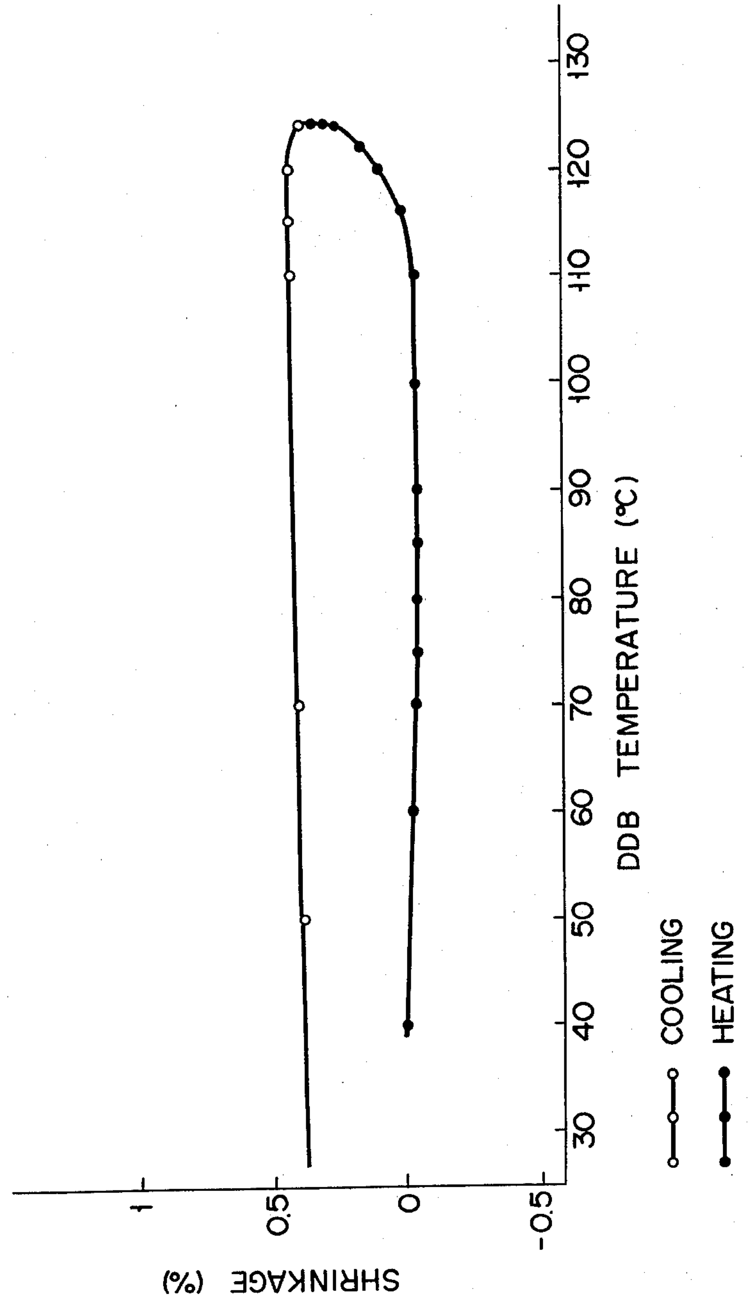

FIG. 5 shows the dimensional change of the drawn film which was treated in the same manner as in the case described with reference to FIG. 4 except that DDB was heated to 124° C. The dimensional change of the drawn film in this case fell within the range of ±0.5%.

Figure 6:
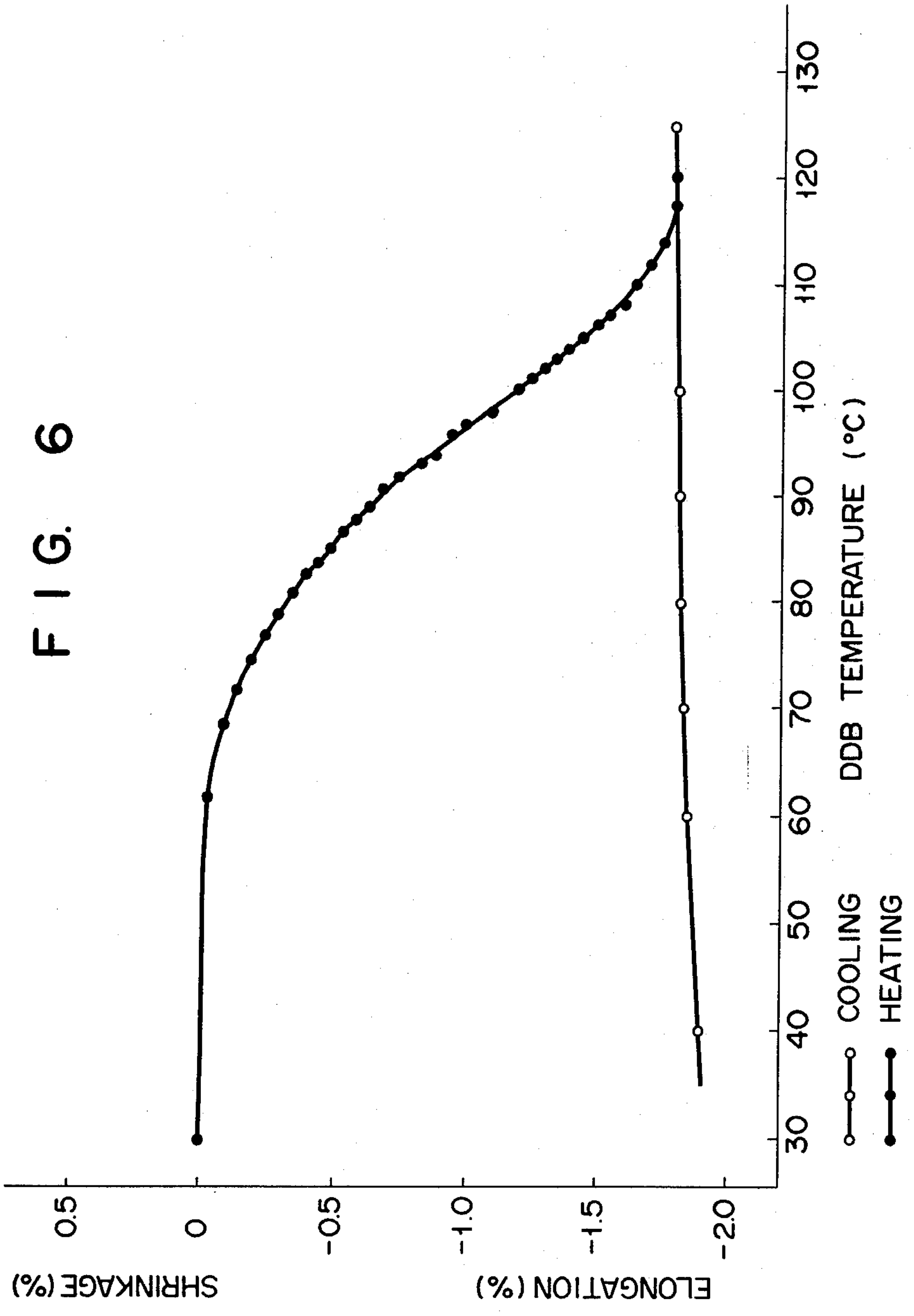

FIG. 6 shows the dimensional change of the drawn film in DDB which was immersed in DDB at 124° C. and was subjected to ether extraction of DDB. It is clearly seen from FIG. 6 that the swelling of the drawn film is attributable to the dimensional change of the intramicrofibril amorphous parts.

In this case, the shrinkage, as was seen in the case of FIG. 4, does not occur even if the drawn film is immersed in DDB at 125° C.; it elongates by 2% in the longitudinal direction. Although abrupt shrinkage due to the melting of the crystalline part may occur if DDB is heated further, the dimensional stability can be kept within an acceptable range as long as DDB is cooled from 125° C.

Figure 7:
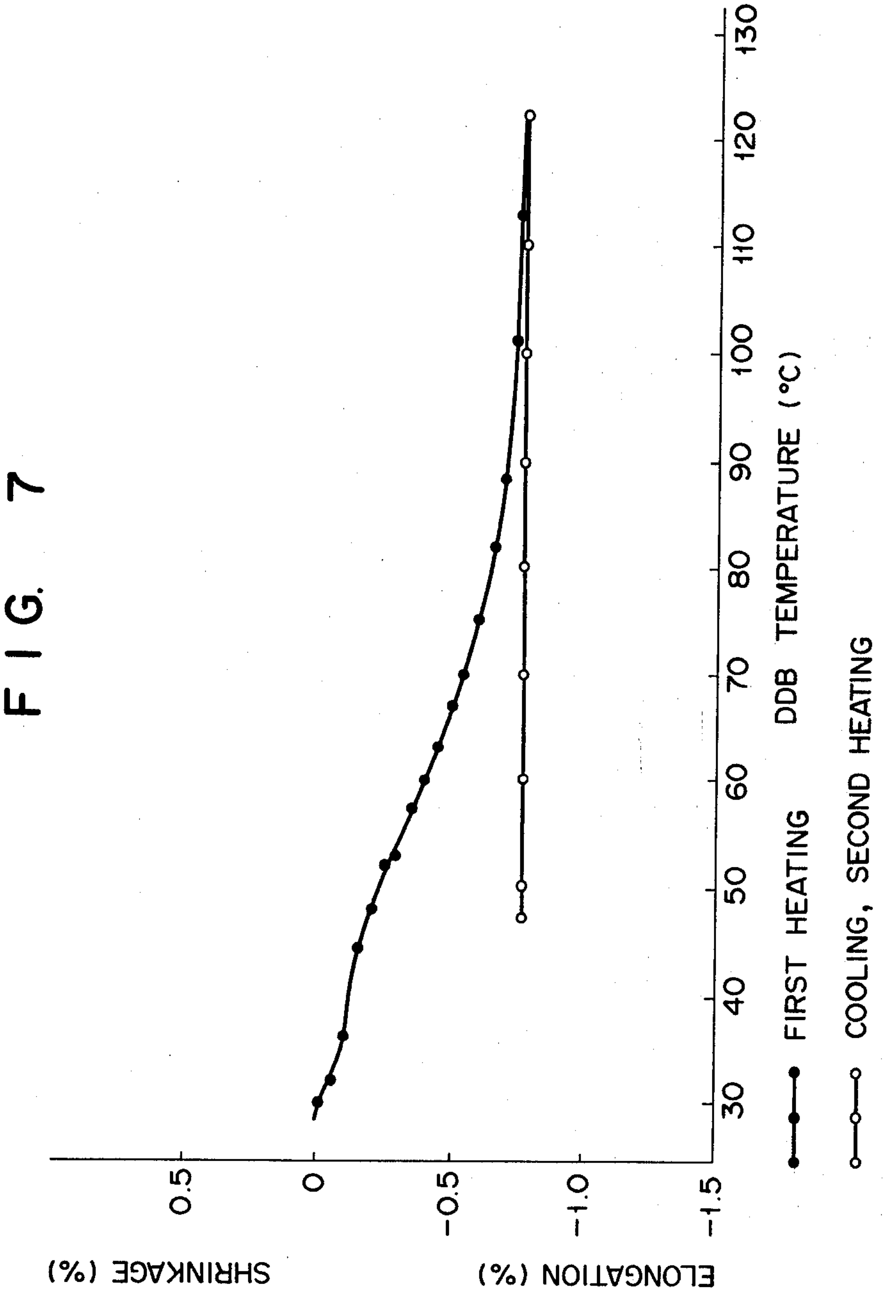

FIG. 7 shows the dimensional change of the drawn film which was swollen in DDB and dried in a vacuum. In this case, behavior that resembles that of the ether extracted film were observed. However, the magnitude of the change was very small, virtually nil, during cooling and second heating.

Figure 8:
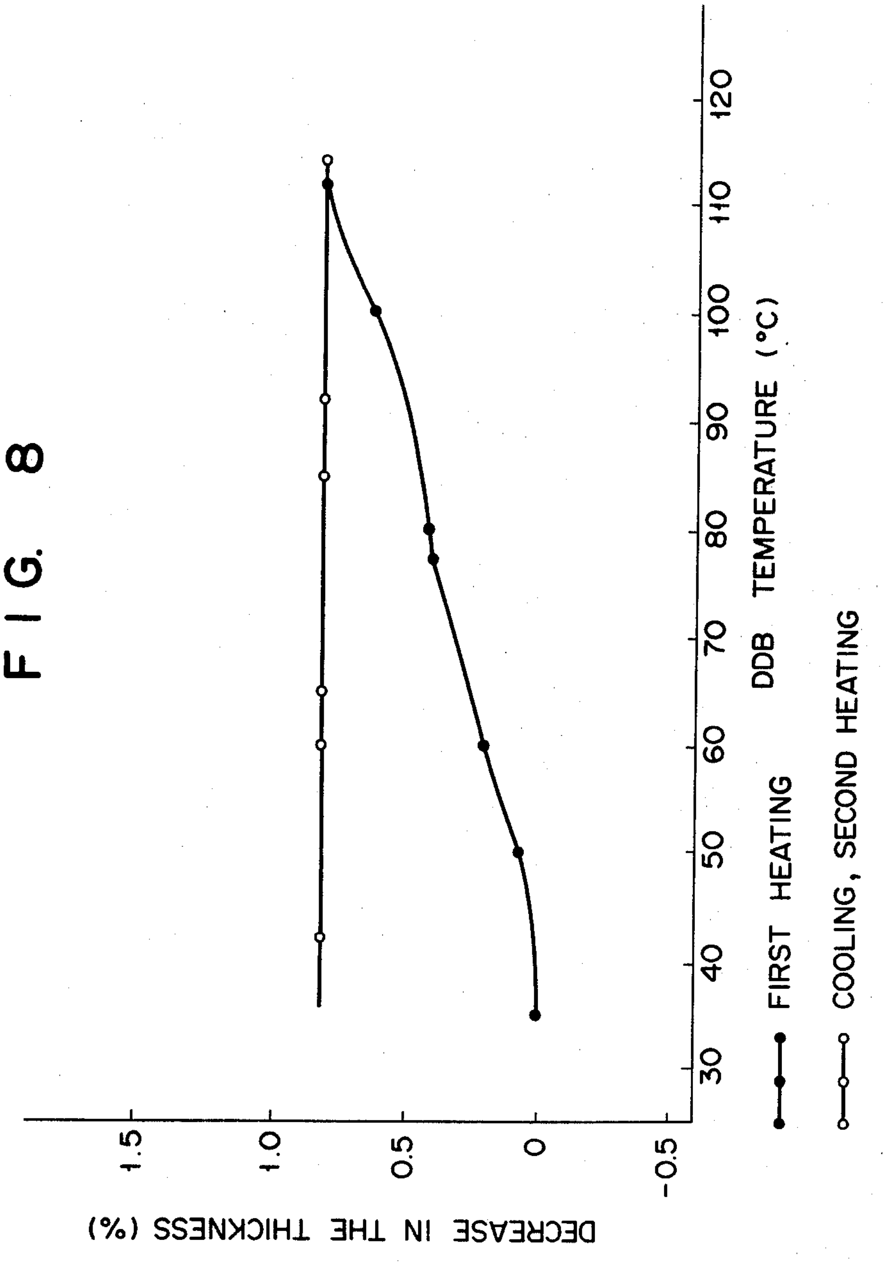

Referring to FIG. 8, the thickness of the film decreases upon first heating, but does not decrease at all during cooling and the second heating.

In consideration of the facts presented above, there is provided according to a first aspect of the present invention a polyolefin film for electric insulation which is obtained by using a uniaxially drawn film of crystalline polyolefin as a base material, in which intramicrofibril and intermicrofibril amorphous parts of the uniaxially drawn film are impregnated with a low loss insulation oil, and which simultaneously satisfies the following conditions:

(i) a tensile Young's modulus of the film impregnated with the insulation oil is $2\times10^4$ kg/cm$^2$ or higher;

(ii) a dimensional change (change in length) of the uniaxially drawn film in the insulation oil at 100° C. is within a tolerance of ±2%;

(iii) a ratio of a long period at room temperature of an ether extraction residue of the uniaxially drawn film to a long period thereof before ether extraction is within a range of 0.900 to 0.998; and (iv) a dimensional increase of the ether extraction residue in the insulation oil at 100° C. is 1.0% or higher.

According to a second aspect of the present invention, there is also provided a method for manufacturing a polyolefin film for electric insulation comprising applying a tensile stress of 40 kg/cm$^2$ or lower on a uniaxially drawn film of crystalline polyolefin having a tensile Young's modulus of $3\times10^4$ kg/cm$^2$ or higher, and, at the same time, immersing the film in a low loss insulation oil heated to a temperature lower by 50° to 10° C. than the melting point of the crystalline polyolefin in said oil.

The crystalline polyolefin for the uniaxially drawn film used in the present invention is a linear hydrocarbon polyolefin. Examples of such linear hydrocarbon polyolefins include low density or high density polyethylene, isotactic polypropylene, poly-4-methylpentene-1, polybutene, polyisobutylene, or mixtures thereof. Also, examples of crystalline polyolefin include a mixture of the polyolefin as mentioned above with 10 PHR (parts per hundred ratio of the resin) or less of one or more low loss resins such as an unsintered fluororesins, aromatic resins or the like. In the uniaxially drawn film in which unsintered polytetrafluoroethylene is dispersed in the polypropylene matrix, the unsintered polytetrafluoroethylene is dispersed in the matrix in the fiber-like form. As a result of this, the apparent density of the polytetrafluoroethylene part in the film becomes as low as 1.5 to 1.6. This seems to be attributable to the voids formed in this part. Therefore, if a film of this type is to be used, the density of the polytetrafluoroethylene part can be increased (to about 2.0) by compression in a liquid medium at 300 atm or higher. If such a treatment is performed, the electrical characteristics (particularly the dielectric breakdown strength) of the uniaxially drawn polypropylene film are improved. Among the materials proposed above, it is preferable to use an isotactic polypropylene for the uniaxially drawn film. It is particularly preferable to use an isotactic propylene which contains at least 95% of insoluble components in boiled heptane.

The uniaxially drawn film of crystalline polyolefin according to the present invention preferably has a tensile Young's modulus of $3\times10^4$ kg/cm$^2$ or more, a dielectric constant $\epsilon$ of 3.0 or less, and a dielectric loss tangent tan $\delta$ of 0.10%. The degree of drawing must be 4 times or more for an isotactic polypropylene, for example, when the drawing temperature is 135° C. A uniaxially drawn film of crystalline polyolefin having a thickness of about 80 to 250$\mu$ is generally used, and the manufacturing method therefor is not particularly limited. A uniaxially drawn film of crystalline polyolefin subjected to embossing is also preferable.

The low loss insulation oil used in the present invention is preferably an insulation oil which has excellent compatibility with the polyolefin such as alkylbenzene, polybutene, liquid paraffin, mineral oil or the like. These oils have a dielectric constant $\epsilon$ of 2 to 3 and a dielectric loss tangent tan $\delta$ of 0.001 to 0.02%. In order to evaluate the compatibility of the insulation oil with the polyolefin, an S.P. (solubility parameter) is generally used. The insulation oils having the S.P. values of 6 to 10 are preferable. Alkylbenzene having an S.P. value of about 8.4 is most preferable for the purpose of the present invention.

In order to obtain the insulation film of the present invention, a tensile stress of 40 kg/cm$^2$ or less (in the case of batch method) or about 10 to 20 kg/cm$^2$ (in the continuous travel method) is applied to the uniaxially drawn film of crystalline polyolefin. At the same time, the uniaxially drawn film is immersed in the insulation oil heated to a temperature which is lower by 50° to 10° C. than the melting point of the crystalline polyolefin in the insulation oil. If the tensile stress exceeds 40 kg/cm$^2$, it takes time for the insulation oil to disperse in the polyolefin film. This results in the disadvantage that the dimensional accuracy of the obtained film is degraded.

The heating temperature in the insulation oil is limited to a point lower by 50° to 10° C. than the melting point of the crystalline polyolefin in the insulation oil. If the treatment temperature is more than 50° C. below the melting point of the polyolefin, it takes time to impregnate the polyolefin film with the insulation oil. On the other hand, if the treatment temperature is less than 10° C. below the melting point of the polyolefin, the polyolefin starts to dissolve. The melting point of the polyolefin in the insulation oil can be measured by a DSC apparatus with liquid cells. The melting point of isotactic polypropylene in the dodecylbenzene oil is 135° to 150° C. The melting point of high-density polyethylene in the dodecylbenzene oil is 120° to 130° C. The treatment time is generally within several tens of seconds. The treatment time is controlled by decreasing the travel speed of the film in the continuous process or by increasing or decreasing the number of turns of the film. Generally, no problems arise if the treatment time is prolonged. It is advisable to employ radiation with ultrasonic waves in the treatment tank in order to shorten the treatment time.

The treatment temperature of the drawn film of crystalline polyolefin in the insulation oil is so selected that the thermal shrinkage of the drawn film of crystalline polyolefin is 5 to 9%, preferably, about 8%; the increase in the long period in the direction parallel to the drawing direction of the drawn film is within the range of 5 to 10% at room temperature; or the weight increase is up to about 10%. When the drawn film is treated under these conditions, the dimensional change (length) in the insulation oil at 100° C. is 5% or less. If the drawn film is immersed in the oil at a temperature range which allows the thermal shrinkage of 9% or more or the increase in the long period of 10% or more, the crystalline parts of the drawn film start dissolving. This results in reorganization of the structure of the drawn film, and a significant decrease in the Young's modulus.

The impregnation of the uniaxially drawn film of crystalline polyolefin with the insulation oil is performed by travelling the film in the insulation oil, immersing a loose coil of the film in the insulation oil, or immersing the film wound on a conductive material in the insulation oil.

The degree of impregnation of the drawn film with the insulation oil can be clearly checked by the known infrared absorption spectrum method. For example, if dodecylbenzene oil (DDB) is used, the absorption peak in the vicinity of the wave number of 1,600 $cm^{-1}$ due to the presence of benzene rings may be observed. This absorption peak of the insulation oil in the intramicrofibril or intermicrofibril amorphous parts persists even after the film is left to stand in a vacuum (about $10^{-2}$ to $10^{-3}$ mm Hg) for a long time.

If the intramicrofibril amorphous parts are impregnated with the insulation oil compatible therewith, an increase in the long period is observed as has been described above. When the insulation oil contained is extracted, the long period decreases. When crystal thickening is observed, the long period does not generally change in a reversible manner. However, if the insulation oil is introduced by the swelling of the amorphous parts as in the present invention, the long period changes in a reversible manner.

If the film is impregnated with DDB in such a manner, the weight increase of the film is at most about 10%.

foreign materials on its surface can also be removed, so that the problem of static electricity is also solved.

Warm water is preferably used for this rinsing treatment. Even when the film is also radiated with ultrasonic waves, the insulation oil inside the drawn film, especially inside the amorphous parts is not adversely affected.

Even when rinsed with water, the film remains substantially unchanged with no water layer formed on its surface. Therefore, this treatment does not present any problems in the succeeding steps.

In summary, the present invention provides a polyolefin film for electric insulation which is obtained by using a uniaxially drawn film of crystalline polyolefin, in which intramicrofibril and intermicrofibril amorphous parts of the uniaxially drawn film are impregnated with a low loss insulation oil, and which simultaneously satisfies the following conditions:

(i) a tensile Young's modulus of the film impregnated with the insulation oil is $2\times10^4$ kg/cm$^2$ or higher;

(ii) a dimensional change (change in length) of the uniaxially drawn film in the insulation oil at 100° C. is within a tolerance of ±2%;

(iii) a ratio of a long period at room temperature of an ether extraction residue of the uniaxially drawn film to a long period thereof before ether extraction is within a range of 0.900 to 0.998; and (iv) a dimensional increase of the ether extraction residue in the insulation oil at 100° C. is 0.1% or higher.

Thus, the problems with the conventional UHV OF cables as described above can be solved.

Obviously, since the uniaxially drawn film of crystalline polyolefin is heat-treated in an insulation oil or subjected to a special swelling treatment, the changes of its thickness can be effectively reduced to a great extent.

As may be seen from the above description and the Examples to be described below, the present invention provides an insulation film which solves the problems of the prior art and which is industrially convenient.

The present invention will now be described by way of its examples.

EXAMPLES 1 TO 5

Uniaxially drawn films of isotactic polypropylene (110μ thickness, 165° C. inherent melting point, 135° C. melting point in DDB, 50,000 kg/cm$^2$ Young's modulus, and 185 Å long period) were immersed in heated dodecylbenzene oil (DDB) under the tensile stress and for the length of time shown in Table 1 below. The various characteristics of the films so treated were measured, with the results also shown in Table 1.

TABLE 1

| Example | Tensile stress (Kg/cm$^2$) | Time (min) | Long period (Å) | Shrinkage (%) | Weight increase (%) | Change in thickness in dodecylbenzene at 100° C. (%) | Imp breakdown voltage (KV/cm) | Young's modulus (Kg/cm$^2$) |
|---|---|---|---|---|---|---|---|---|
| 1 | 5 | 5 | 209 | 0.8 | 6 | <1 | 220 | 39,000 |
| 2 | 10 | 5 | 206 | 0.6 | 6.5 | <1 | 222 | 41,000 |
| 3 | 40 | 5 | 205 | 0.5 | 7 | <1 | 230 | 46,000 |
| 4 | 5 | 10 | 210 | 1.0 | 8 | <1 | 215 | 35,000 |
| 5 | 5 | 20 | 216 | 1.2 | 8 | <1 | 218 | 33,000 |

The drawn film impregnated with the insulation oil is rinsed, if necessary, with water (together with ultrasonic wave radiation for better effect) in order to remove the insulation oil adhering to the surface of the film. When the film is subjected to this treatment, other

EXAMPLE 6

A uniaxially drawn film of C-axis oriented isotactic polypropylene (150μ thickness, 50 mm length, 5 mm width, 35,000 kg/cm$^2$ Young's modulus, and 185 Å long period) was immersed in DDB under a tensile stress of 5 kg/cm². The DDB temperature was increased at a rate of 1° C. per minute from the room temperature, 25° C. The dimensional change was measured. The obtained results are shown in a graph of FIG. 9.

Figure 9:
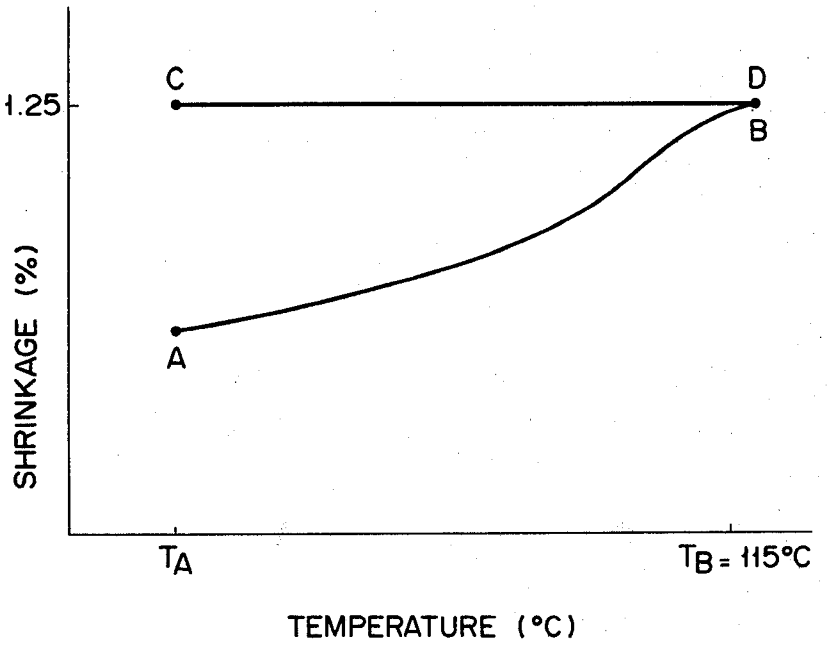

Referring to FIG. 9, the film continuously shrinks from time A at room temperature to time B at 115° C. At time B, the shrinkage was 1.25%, the thickness was 157μ, and the long period was 200 Å.

Changes in the wide angle X-ray pattern were not observed. It was thus confirmed that the swelling occurs at the amorphous parts and this does not affect the orientation of the crystals. The weight increase at time B was 7.5%.

Then, the temperature was decreased at a rate of 2° C. per minute from time B. The dimensional change was not observed until the temperature reached room temperature at time C. When the temperature was increased again at a rate of 1° C. per minute from time C, no dimensional change was observed until time D.

Next, the film in the condition at time B was cooled to room temperature and was immersed in DDB at 100° C. After ten days in this condition, no change in thickness was observed.

The film in the condition at time C was subjected to Soxhlet extraction with ethyl ether for 120 minutes to remove the insulation oil. The film was then subjected to heating in the insulation oil at a constant temperature increasing rate as described above. A change in length of 5.5% was observed at 100° C.

EXAMPLES 7 TO 10 AND COMPARATIVE EXAMPLES 1 TO 3

Uniaxially drawn films of isotactic polypropylene (110μ thickness, 165° C. inherent melting point and 38,000 kg/cm² Young's modulus) were immersed in DDB at temperatures shown in Table 2 without applying any tension on either end, after measuring the long periods before immersion.

They were measured for their long period after immersion in the insulation oil, Young's modulus, oil resistance, thermal shrinkage at different temperatures, and the like. The obtained results are shown in Table 2 below.

TABLE 2

| Example | Long period before immersion in oil (Å) | Immersion temperature (°C.) | Shrinkage (%) | Long period after immersion in oil (Å) | Young's molulus (kg/cm²) | Oil resistance * (%) |
|---|---|---|---|---|---|---|
| Example 7 | 187 | 100 | 0.9 | 194 | 31,000 | <2 |
| Example 8 | 187 | 110 | 1.2 | 198 | 30,000 | <1 |
| Example 9 | 187 | 120 | 1.6 | 202 | 28,000 | 0 |
| Example 10 | 187 | 125 | 1.8 | 203 | 25,000 | 0 |
| Comparative Example 1 | 187 | 60 | 0 | 187 | 38,000 | 5 |
| Comparative Example 2 | 187 | 135 | 12 | 250 | 1,000 | 10 |
| Comparative Example 3 | 187 | 145 | 40 | 305 | 800 | 18 |

*In order to test oil resistance, the samples were immersed in dodecylbenzene oil (DDB) at a temperature of 100° C. for 40 hours. After the samples were removed from DDB, the DDB remaining thereon was wiped with filter papers. Changes in the thickness of the sample before and after immersion in DDB were measured.

EXAMPLES 11 TO 15

In order to examine the effect ultrasonic wave radiation, uniaxially drawn films of isotactic polypropylene (120μ thickness and 40,000 kg/cm² Young's modulus) were immersed in DDB at 110° C. and were radiated with ultrasonic waves for the times shown in Table 3. The ultrasonic waves of 200 W and 35 kHz frequency were used.

Table 3 below shows the relationship between the immersion time, the oil resistance and the change in length of the obtained films in DDB at 100° C.

TABLE 3

| Example | Ultrasonic radiation | Immersion time (min) | Change in length in dodecylbenzene at 100° C. (%) | Oil resistance* (%) |
|---|---|---|---|---|
| 11 | Performed | 0.2 | 0.8 | <1 |
| 12 | Performed | 1 | 0.35 | <1 |
| 13 | Performed | 5 | 0.2 | <1 |
| 14 | Not performed | 0.2 | 1.9 | 4 |
| 15 | Not performed | 15 | 1.5 | <1 |

*Oil resistance was measured according to the same procedures as in Examples 7 to 10.

According to the results shown in Table 3 above, the impregnation of the film with the insulation oil is observed within 0.2 to 1 minute upon radiation with the ultrasonic waves. These effects do not change after prolonged immersion. As may be seen from the Comparative Examples, longer immersion times (e.g., 15 minutes) are required when the films are not radiated with the ultrasonic waves. If the immersion time is short, satisfactory oil resistance is not obtained.

EXAMPLE 16 AND COMPARATIVE EXAMPLES 4 TO 6

To 100 parts of an isotactic polypropylene powder (120 mesh, 165° C. inherent melting point, 150° C. melting point in DDB, and 20 melt index) were dropwise added 5 parts of an aqueous dispersion of unsintered polytetrafluoroethylene (0.3μ average particle size, 60% polymer content, and 1.5 dispersion specific gravity). After the mixture was well dried, it was extruded by a twin-screw-type extruder (L/D=20 and 75 mm screw diameter) at a die temperature of 220° C. into sheets of 1,200 mm width and 2 mm thickness. The extruded sheets were uniaxially drawn into sheets of 150μ thickness by a drawing machine with a hydraulic type pressure roll (400 mm diameter).

The drawn films had a Young's modulus of 45,000 kg/cm². When these drawn films were observed by a polarizing microscope with a hot stage under heating at 180° C., the polytetrafluoroethylene fiber of 0.5 to 1μ diameter were seen aligned in the draw direction.

The films were then immersed in DDB at various temperatures as shown in Table 4 below and a tensile stress of 20 kg/cm² was applied. The various characteristics of the films so treated were measured, with the results shown in Table 4.

TABLE 4

| | Immersion temperature and time (°C., min) | Ac breakdown voltage (KV/mm) | Young's modulus (Kg/cm²) | Oil resistance (%) |
|---|---|---|---|---|
| Example 16 | 85, 8 | 115 | 43,000 | <2 |
| | 100, 5 | 118 | 43,000 | <1 |
| | 110, 3 | 107 | 40,500 | <1 |
| | 120, 1 | 98 | 39,500 | <1 |
| Comparative Example 4 | 142, 1 | 72 | 15,000 | 12 |
| Comparative Example 5 | 142, 3 | 66 | 8,000 | 30 |
| Comparative Example 6 | — | 117 | 45,000 | 3.5 |

The temperatures adopted in Comparative Examples 4 and 5 are above the limited range of the present invention. In Comparative Example 6, the immersion of the film in the insulation oil was not performed.

According to the results obtained, the oil resistance of the film is significantly improved when the immersion temperature is within the range of 85° to 120° C. On the contrary, when the immersion temperature is as high as 142° C., the crystal structure of the drawn material is reorganized. Therefore, the Young's modulus of the obtained film is also lowered, and the electrical characteristics of the film are also degraded.

EXAMPLES 17 TO 19

A uniaxially drawn polypropylene film in which was dispersed a fine fibrous structure of unsintered polytetrafluoroethylene obtained by the method of Example 16 was placed in silicone oil and given various static pressure isotropically. A Bridgman-scaled piston-cylinder-type pressure vessel, 35 mm in diameter and 80 mm in length, was used. Apparent density of unsintered PTFE phase was increased 5 to 25% by the said pressure treatment. Polypropylene film treated with pressure in such a manner as in a sealed vessel was immersed for 20 minutes under the tensile force of 5 kg/cm² in dodecyl benzene (DDB) at 120° C. By the DDB-treatment no dimensional change of the film was observed in DDB of 100° C. for 40 hrs. Table 5 shows the effect of applied pressures on physical properties such as AC breakdown voltage, tensile Young's modulus.

TABLE 5

| Example | Applied pressure (Atm) | AC breakdown voltage (KV/mm) | Tensile Young's modulus (kg/cm²) |
|---|---|---|---|
| 17 | 300 | 110 | 416 |
| 18 | 700 | 118 | 418 |
| 19 | 1000 | 120 | 425 |

EXAMPLES 20 TO 22 AND COMPARATIVE EXAMPLES 7 AND 8

To a 100 phr of powdery high density polyethylene (120 to 150 mesh) having a melt index of 25 and a melting point of 135° C. was added net 2 phr of unsintered polytetrafluoroethylene, 0.3μ in average granular diameter in aqueous dispersion of 1.5 in density, and 60% in polymer concentration to obtain a uniform mixture.

After being dried in vacuum, the blended compound was extruded with a twin-screw-type extruder and the extrudate was pelletized. The apparent melt index of the blended compound so obtained was estimated at 5.5. By the use of the above prepared compound sheet material, 0.8 mm in thickness and 1000 mm in width, was shaped by an extruder equipped with a T-die. The decrease in the melt index of the blended compound may have resulted from the separation of polyethylene matrix into very small phases by a fine fibrilar network.

The above prepared sheet was uniaxially drawn about 8 times at 120° C. by a roll-type stretching machine.

The melting behavior of the drawn film in dodecyl benzene (DDB) was measured by differential scanning calorimetry (DSC) in a liquid cell. The melting peak was observed at 120° C. and a heating rate of 10° C./min. The long period of the drawn film was measured by small angle x-ray scattering and estimated at 250 Å. The tensile Young's modulus of the drawn film was 36000 kg/cm².

The above-mentioned oriented film was immersed in DDB for 30 min. under a tensile force of 2 to 80 kg/cm².

The physical properties of the film was measured for evaluation after the DDB oil spread on its surface was wiped off. Table 6 shows the results obtained. Comparative Examples 7 and 8 were performed under a tensile force of more than 40 kg/cm², which is above the claimed limit.

TABLE 6

| | Tensile stress (kg/cm²) | Young's modulus (kg/cm²) | Long period (Å) | AC breakdown voltage (KV/mm) | Oil resistance at 100° C. (%) |
|---|---|---|---|---|---|
| Example 20 | 2 | 30,000 | 258 | 110 | 0.2 |
| Example 21 | 10 | 31,000 | 257 | 111 | 0.90 |
| Example 22 | 40 | 34,000 | 255 | 111.5 | 0.95 |
| Comparative Example 7 | 60 | 35,800 | 253 | 112 | 4 |
| Comparative Example 8 | 80 | 35,900 | 251 | 112 | 5 |

Note:
Ac-BDV measurements were performed at room temperature between sphere (20 mm in diameter) and plate electrode.

EXAMPLES 23 TO 25 AND COMPARATIVE EXAMPLES 9 AND 10

100 phr of poly-4-methylpentene-1 (TPX resin) powder of MI=32 was uniformly mixed at 12° C. with 3 phr of unsintered polytetrafluoroethylene, which was supplied as aqueous dispersion of 60% resin content, by a mildly operating powder mixer. The mixture was dried at 90° C. in vacuum and was kneaded with twin-screw type extruder where the die temperature was 290° C., and the treated material was pelletized. The pellets so obtained was shaped into a 0.8 mm-thick sheet by a 40 mm single screw type extruder, and the sheet was drawn 2 to 8 times by a roll-type drawing machine at 180° C. in the direction of machine.

The stretched films of various tensile modulus so obtained were immersed at 125° C. in DDB for 10 minutes without tension.

In table 7 are shown the physical properties of the film obtained by the above mentioned immersion process.

TABLE 7

| | Draw ratio | Young's modulus of the drawn material (kg/cm²) | Young's modulus of the film impregnated with DDB (kg/cm²) | Oil resistance at 100° C in DDB (%) |
|---|---|---|---|---|
| Example 23 | 8 | 42,000 | 33,600 | <1 |
| Example 24 | 7.5 | 40,000 | 32,000 | <1 |
| Example 25 | 6 | 38,000 | 30,400 | <1 |
| Comparative Example 9 | 2 | 15,000 | 12,000 | 12 |
| Comparative Example 10 | 3 | 22,000 | 17,600 | 10 |

What we claim is:

1. An electrically insulating oil-impregnated polyolefin film for electrical insulation having intramicrofibril and intermicrofibril amorphous parts of a uniaxially drawn film of crystalline polyolefin which are impregnated with a low loss insulation oil, said film simultaneously satisfying the following conditions:

(i) a tensile Young's modulus of the film impregnated with the insulation oil is not lower than $2\times10^4$ kg/cm²;

(ii) a dimensional change (change in length) of the uniaxially drawn film in the insulation oil at 100° C. is within a tolerance of ±2%;

(iii) a ratio of a long period at room temperature of an ether extraction residue of the uniaxially drawn film to a long period thereof before ether extraction is within a range of 0.900 to 0.998; and (iv) a dimensional increase of the ether extraction residue in the insulation oil at 100° C. is not lower than 1.0%.

2. The film according to claim 1, wherein the uniaxially drawn film of crystalline polyolefin is a drawn film of a linear hydrocarbon polyolefin.

3. The film according to claim 1, wherein the uniaxially drawn film of crystalline polyolefin is a drawn film of a polymer selected from the group consisting of high density polyethylene, isotactic polypropylene, poly-4-methylpentene-1, polybutene, and polyisobutylene.

4. The film according to claim 1, wherein the uniaxially drawn film of crystalline polyolefin is a drawn film of isotactic polypropylene.

5. The film according to claim 1, wherein the uniaxially drawn film of crystalline polyolefin is a drawn film of a mixture of polyolefin as a base material with net 10 parts by weight or less, based on 100 parts by weight of the polyolefin, of low loss resins in aqueous dispersion selected from the group consisting of fluororesins and aromatic resins.

6. The film according to claim 1, wherein the uniaxially drawn film of crystalline polyolefin is a drawn film of a mixture of polyolefin and unsintered polytetrafluoroethylene, and a phase of the unsintered polytetrafluoroethylene dispersed in a polyolefin matrix is increased in density.

7. The film according to claim 1, wherein the low loss insulation oil impregnated in the drawn film is an insulation oil selected from the group consisting of alkylbenzene, polybutene, liquid paraffin and mineral oil.

8. The film according to claim 1, wherein the low loss insulation oil impregnated in the drawn film is an aromatic hydrocarbon oil.

9. The film according to claim 1, wherein the low loss insulation oil with which the film is impregnated is dodecylbenzene.

10. The film according to claim 1, wherein the film is embossed.

11. The film according to claim 1, wherein the film has a thickness of 80 to 250μ.

12. A process for manufacturing an oil-impregnated polyolefin film for electric insulation comprising applying a tensile stress of not higher than 40 kg/cm² to a uniaxially drawn film of crystalline polyolefin which has a tensile Young's modulus of not lower than $3\times10^4$ kg/cm², and, at the same time, immersing the drawn film in a low loss insulation oil heated to a temperature lower by 50° to 10° C. than the melting point of the polyolefin in said oil to produce an oil-impregnated polyolefin film for electric insulation in which intramicrofibril and intermicrofibril amorphous parts of a uniaxially drawn film of crystalline polyolefin are impregnated with a low loss insulation oil, and which simultaneously satisfies the following conditions:

(i) a tensile Young's modulus of the film impregnated with the insulation oil is not lower than $2\times10^4$ kg/cm²;

(ii) a dimensional change (change in length) of the uniaxially drawn film in the insulation oil at 100° C. is within a tolerance of ±2%;

(iii) a ratio of a long period at room temperature of an ether extraction residue of the uniaxially drawn film to a long period thereof before ether extraction is within a range of 0.900 to 0.998; and (iv) a dimensional increase of the ether extraction residue in the insulation oil at 100° C. is not lower than 1.0%.

13. The process according to claim 12, wherein the uniaxially drawn film of crystalline polyolefin is a drawn film of a linear hydrocarbon polyolefin.

14. The process according to claim 12, wherein the film according to claim 3 is used.

15. The process according to claim 12, wherein the film according to claim 4 is used.

16. The process according to claim 12, wherein the film according to claim 5 is used.

17. The process according to claim 12, wherein the film according to claim 6 is used.

18. The process according to claim 12, wherein the uniaxially drawn film of crystalline polyolefin is embossed.

19. The process according to claim 12, wherein the uniaxially drawn film of crystalline polyolefin has a thickness of 80 to 250μ.

20. The process according to claim 12, wherein the low loss insulation oil is an insulation oil selected from the group consisting of alkylbenzene, polybutene, liquid paraffin and mineral oil.

21. The process according to claim 12, wherein the insulation oil according to claim 8 is used.

22. The process according to claim 12, wherein the insulation oil according to claim 9 is used.

23. The process according to claim 12, wherein the drawn film is immersed in the insulation oil under radiation with ultrasonic waves.

24. The process according to claim 12, wherein the drawn film is immersed in the insulation oil while continuously travelling in the heated insulation oil.

25. The process according to claim 12, wherein the drawn film in a loose coil is immersed in the heated insulation oil.

* * * * *